No. 842,601. PATENTED JAN. 29, 1907.
R. E. WOODSON, W. B. KNIGHT & J. NILSON.
FEEDING MACHINE.
APPLICATION FILED AUG. 24, 1905.
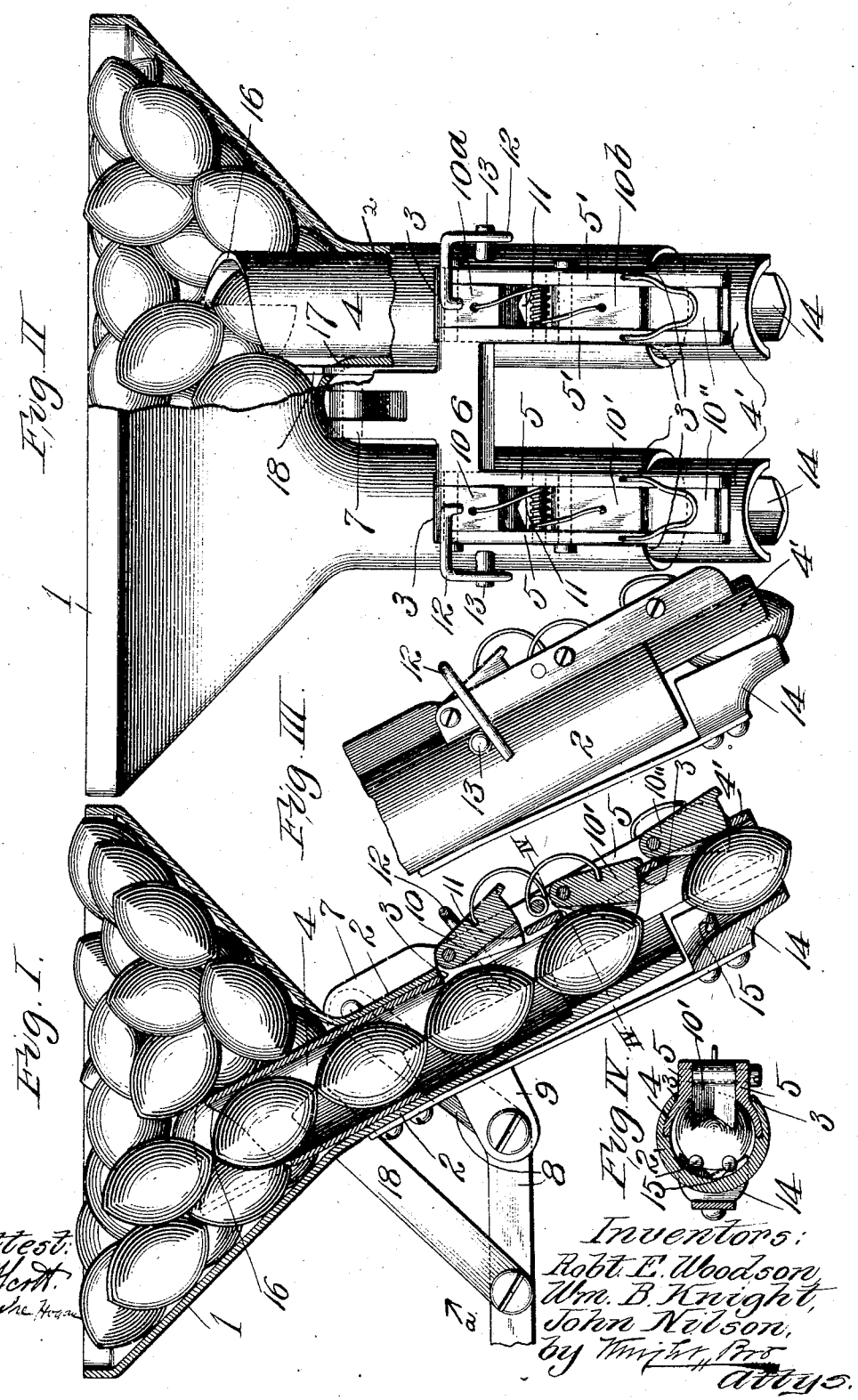

UNITED STATES PATENT OFFICE.

ROBERT E. WOODSON AND WILLIAM B. KNIGHT, OF ST. LOUIS, MISSOURI, AND JOHN NILSON, OF SAN FRANCISCO, CALIFORNIA; SAID NILSON AND KNIGHT ASSIGNORS TO SAID WOODSON.

FEEDING-MACHINE.

No. 842,601.     Specification of Letters Patent.     Patented Jan. 29, 1907.

Application filed August 24, 1905. Serial No. 275,542.

*To all whom it may concern:*

Be it known that we, ROBERT E. WOODSON and WILLIAM B. KNIGHT, citizens of the United States, residing in the city of St. Louis, in the State of Missouri, and JOHN NILSON, a citizen of the United States, residing in San Francisco, in the State of California, have invented certain new and useful Improvements in Feeding-Machines, of which the following is a full, clear, and exact description, reference being had to the accompanying drawings, forming part of this specification.

Our invention relates to a new and useful improvement in feeding-machines, and has for its object to produce a device of this character which though simply constructed is positive in its action and susceptible of being operated at a high speed without becoming choked or otherwise impaired.

Figure I is a vertical section taken through the hopper and one of the delivery tubes or spouts. Fig. II is in part an elevation and in part a vertical section taken at approximately a right angle to the section-line of Fig. I. Fig. III is a fragmentary view, in side elevation, of one of the delivery tubes or spouts. Fig. IV is a transverse section taken on the line IV IV, Fig. I.

1 indicates a hopper having depending therefrom preferably two hollow guide members 2 2, which have communication with the interior of said hopper. These hollow guide members are each provided with a slot 3 in the front thereof to produce guides for reciprocatory feed and delivery tubes 4 4, arranged within said members 2 2.

5 5 and 5' 5' indicate lugs formed integral with or secured to the delivery-tubes 4 4 and are designed to project through and operate in the slots 3 3, the two innermost lugs 5 and 5' being connected by the cross-piece 6, which in turn is provided with a bifurcated ear 7, designed to receive one end of a bell-crank lever 8, pivoted to a lug 9, supported by the guide members 2 2. Pivotally mounted between the lugs 5 5 and 5' 5', respectively, are spring-actuated dogs 10, 10', 10$^a$, and 10$^b$, which operate through slots 11, formed in the wall of the telescopic delivery-tubes 4 4, and are thereby permitted to enter the interior of said tubes in order that they may operate upon the articles to be fed. The dogs 10 and 10' are arranged in vertical alinement with each other, as are also the dogs 10$^a$ and 10$^b$, and the uppermost dogs 10 and 10$^a$ are each provided with an arm 12, so arranged that when the delivery-tubes are in their uppermost position they will coöperate with lugs or projections 13 13, carried by the guide members 2 2, in such manner as to cause said dogs to be moved outwardly from the interior of said tubes 4 4, whereby they are removed from the path of movement of the material to be fed in the machine. For the purpose of distinction the dogs 10 and 10$^a$ will be hereinafter termed "feeding-dogs," and the dogs 10' and 10$^b$ will be hereinafter termed "restraining-dogs."

The delivery-tubes 4 4 terminate in semi-cylindrical portions 4' 4', and in juxtaposition to said semicylindrical portions are arranged yielding or spring-actuated jaws 14 14, carrying inwardly-disposed prongs 15 15. The functions of these parts will be hereinafter described.

From an inspection of Figs. I and II of the drawings it will be observed that the upper ends of the telescopic feed and delivery tubes 4 4 extend some distance up into the hopper 1 when in their uppermost positions and are provided with spiral or helical upper ends 16, the object of which is to provide against clogging of the material to be fed therethrough.

Formed in the bottom wall of the hopper 1 and preferably located between the delivery-tubes 4 4 are one or more openings or slots 17, (see Fig. II,) and through which is or are designed to pass an agitator or agitators 18, which is or are pivotally connected to one member of the bell-crank lever 8. The dogs 10, 10', 10$^a$, and 10$^b$ are each provided at the inner face with a V-shaped groove, thereby furnishing sharp edges at the lower terminations of the dogs, which will readily engage the article to be fed through the tubes.

In the description of the operation of the device about to follow we will confine such description to but one delivery-tube and its associate elements—namely, that at the left-hand side, Fig. II—it being obvious that as this is practically a double-feeding machine the duplicate parts operate similarly.

Assuming the parts to be in the positions shown in the drawings, the articles to be fed being placed in the hopper 1 will fall through a delivery-tube 4. The first article which enters the tube will descend past the dog 10 and will be arrested by the dog 10', this being due to the dog 10 having been moved out of the path of travel of the article by the arm 12 having contacted with the projection 13 when the tube was elevated. The bell-crank lever 8 being now moved in the direction indicated by the arrow $a$ (see Fig. I) will cause the cross-piece 6, delivery-tube, and the feeding and restraining dogs 10 and 10' carried thereby to descend, and on its initial movement the arm 12 is carried away from the projection 13, and the spring which bears against the dog 10 causes the latter to move inwardly a sufficient distance to engage the first article fed into the delivery-tube and force it downwardly past the prong 15 to cause it to become impinged between the lower semicylindrical portions 4' of the delivery-tube and the spring-controlled jaw 14. The bell-crank lever 8 is now rocked in the opposite direction, which will cause the part 6, delivery-tube 4, and the dogs 10 and 10' carried thereby to be moved upwardly. Upon such upward movement of the parts mentioned the crank-arm 12 strikes against the projection 13 on the guide member 2 and the feeding-dog is retracted from the delivery-tube channel to permit the next article above it to descend to a position beneath said dog. In the next movement of the bell-crank 8 in the direction of the arrow $a$ the action of the feeding-dog 10 will be identical with that first described, while the restraining-dog 10' will engage the article to be fed, which has been held and impinged by the semicylindrical portion 4', and forces the same entirely therefrom.

It will be observed that every movement of the bell-crank lever 8 causes the agitator 18 to act upon and move more or less the articles to be fed which are contained in the hopper and cause them to enter the upper end of the delivery-tube without clogging action. It is desirable to have the bell-crank lever 8 move a sufficient number of degrees to cause the extreme upper end of the tube 4 to descend sufficiently so that its upper end will be removed from the hopper proper and into the depending cylindrical portion 2 in order that the articles to be fed will have free access to the interior of said tube 4. When the tube 4 is raised to its uppermost position, its upper end is located some distance above the bottom of the hopper. This is advantageous in that in its upward movement into the hopper it acts as an agitator for the articles in said hopper.

This machine is designed to feed articles of slightly-varying sizes or dimensions, and while we have illustrated in the drawings the machine operating with the maximum sized articles we have provided means for taking care of smaller sized articles that are of non-circular shape, whereby when the latter are being fed they are caused to be delivered end foremost in approximately axial alinement with the delivery-tubes 4 4 and prevented from canting or occupying a partially or wholly crosswise position as they emerge from the tubes. This means consists of a third set of spring-controlled pawls 10" 10", which we term "alining pawls" and which oppose the jaws 14 14, which we have found by actual practice effectually prevent canting. These alining pawls project through the semicylindrical portions 4' of the delivery-tubes 4, and each dog is adapted to press against and provide a bearing for the articles being fed through the tubes as they move into positions between the tube portions 4' and the jaws 14. As each article passes into the position just referred to it becomes momentarily clamped in alinement with the tube-channel, due to pressure thereagainst at three points by the alining dog, the jaw 14, and the prong 15, carried by said jaw, and when the article is discharged it moves end foremost. The combination of parts is of course only of value in feeding non-circular articles—such, for instance, as those shown in the drawings.

I claim—

1. In a feeding-machine, the combination of a hopper, a delivery-tube reciprocatorily fitted to said hopper, means carried by said tube and adapted to enter thereinto to feed the articles passing through the tube, and means for reciprocating said tube, substantially as set forth.

2. In a feeding-machine, the combination of a hopper, a delivery-tube reciprocatorily fitted to said hopper and having an irregularly-shaped inlet end projecting upwardly into said hopper, means carried by said tube and adapted to enter thereinto to feed the articles passing through the tube, and means for reciprocating said tube, substantially as set forth.

3. In a feeding-machine, the combination of a hopper, a delivery-tube reciprocally fitted to said hopper and having a helicallyshaped upper end arranged to enter said hopper, means carried by said tube and adapted to enter thereinto to feed the articles passing through the tube, and means for reciprocating said tube, substantially as set forth.

4. In a feeding-machine, the combination of a hopper, a delivery-tube reciprocatorily fitted to said hopper, yielding means for restraining the movement of articles fed into said tube from said hopper, a feeding-dog carried by said tube and adapted to enter the channel of said tube, means for retracting said dog and means for reciprocating said tube, substantially as set forth.

5. In a feeding-machine, the combination of a hopper, a delivery-tube reciprocatorily fitted to said hopper, a yielding member carried by said tube for restraining the movement of articles delivered to the tube from said hopper, a spring-controlled feeding-dog carried by said tube and adapted to enter the channel therein, and arranged to deliver the articles being fed past said restraining member, means for retracting said dog and means for reciprocating said tube, substantially as set forth.

6. In a feeding-machine, the combination of a hopper, a delivery-tube reciprocally fitted to said hopper, a yielding restraining-dog carried by said tube, a feeding-dog carried by said tube and arranged above said restraining-dog, means for retracting said feeding-dog and means for reciprocating said tube, substantially as set forth.

7. In a feeding-machine, the combination of a hopper, a delivery-tube reciprocatorily fitted to said hopper, yielding restraining means carried by said tube and adapted to enter thereinto to be engaged by the articles passing through the tube, a feeding-dog carried by said tube and adapted to enter thereinto to engage the articles passing through the tube, means for reciprocating said tube, and means for retracting said feeding-dog, substantially as set forth.

8. In a feeding-machine, the combination of a hopper, a delivery-tube reciprocatorily fitted to said hopper, yielding restraining means carried by said tube and adapted to enter thereinto to be engaged by the articles passing through the tube, a feeding-dog carried by said tube and adapted to enter thereinto to engage the articles passing through the tube, means for reciprocating said tube, and means for retracting said feeding-dog; said last-named means consisting of an arm attached to said feeding-dog and arranged for engagement with a fixed portion of the machine, substantially as set forth.

9. In a feeding-machine, the combination of a hopper, a delivery-tube reciprocatorily fitted to said hopper, feeding means carried by said tube and adapted to enter thereinto, a yieldingly-supported gripper-jaw opposing the lower end of said tube, and means for reciprocating said tube, substantially as set forth.

10. In a feeding-machine, the combination of a hopper, a delivery-tube reciprocatorily fitted to said hopper, means for reciprocating said tube, feeding means carried by said tube and adapted to enter thereinto, and a gripping member opposing the discharge end of said tube; said gripping member being provided with means for preventing retrograde movement of the articles fed into position between it and the discharge end of the tube, substantially as set forth.

11. In a feeding-machine, the combination of a hopper, a delivery-tube reciprocatorily fitted to said hopper, means for reciprocating said tube, feeding means carried by said tube and adapted to enter thereinto, and a gripping member opposing the discharge end of said tube; said gripping member being provided with a prong to prevent retrograde movement of the articles fed into a position between it and the discharge end of said tube, substantially as set forth.

12. In a feeding-machine, the combination of a hopper, a delivery-tube reciprocatorily fitted to said hopper, means for reciprocating said tube, feeding means carried by said tube and adapted to enter thereinto, and a spring-controlled gripping member supported independently of said tube and opposing the discharge end of said tube, substantially as set forth.

13. In a feeding-machine, the combination of a hopper, a delivery-tube reciprocatorily fitted to said hopper, means for reciprocating said tube, feeding means carried by said tube and adapted to enter thereinto, gripping means located at the discharge end of said tube for engagement with the articles passing through the tube before they are discharged therefrom, and means carried by said tube for alining the articles while engaged by said gripping means, substantially as set forth.

14. In a feeding-machine, the combination of a hopper, a delivery-tube reciprocatorily fitted to said hopper, means for reciprocating said tube, feeding means carried by said tube and adapted to enter thereinto, gripping means located at the discharge end of said tube for engagement with the articles passing through the tube before they are discharged therefrom, and an alining dog carried by said tube and located in said tube in a position opposing that occupied by said gripping means, substantially as set forth.

15. In a feeding-machine, the combination of a hopper a delivery-tube reciprocatorily fitted to said hopper, means for reciprocating said tube, feeding means carried by said tube, and an agitator arranged to enter said hopper and having connection with said tube-reciprocating means, substantially as set forth.

16. In a feeding-machine, the combination of a hopper having a guide member depending therefrom, a delivery-tube reciprocatorily positioned in said guide member, feeding means carried by said tube and adapted to enter thereinto, a lever pivoted to said guide member and having connection with said tube for imparting reciprocation to said last-named member, and an agitator connected to said lever and adapted to enter into said hopper, substantially as set forth.

ROBT. E. WOODSON.
  WM. B. KNIGHT.
  JOHN NILSON.

Witnesses to the signatures of Robert E. Woodson and William B. Knight:
 NELLIE V. ALEXANDER,
 WM. H. SCOTT.

Witnesses to the signature of John Nilson:
 OSCAR HOFFMAN,
 SIMON HOFFMAN.